US006610115B1

(12) United States Patent
Hegemann et al.

(10) Patent No.: US 6,610,115 B1
(45) Date of Patent: Aug. 26, 2003

(54) DUST EXTRACTION INSTALLATION FOR BLAST FURNACE GAS

(75) Inventors: Karl-Rudolf Hegemann, Essen (DE); Paul Goedert, Esch sur Alzette (LU); Emile Lonardi, Bascharage (LU); Ken Edward, Figtree (AU); Francis Pott, Diekirch (LU); Guy Thillen, Diekirch (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 09/869,735

(22) PCT Filed: Jan. 7, 2000

(86) PCT No.: PCT/EP00/00087

§ 371 (c)(1),
(2), (4) Date: Oct. 11, 2001

(87) PCT Pub. No.: WO00/40763

PCT Pub. Date: Jul. 13, 2000

(30) Foreign Application Priority Data

Jan. 8, 1999 (LU) ........................................... 90337

(51) Int. Cl.[7] .......................... B01D 45/12; B01D 50/00

(52) U.S. Cl. ............................ 55/315; 55/337; 55/419; 55/457

(58) Field of Search .......................... 55/315, 320, 337, 55/345, 419, 457

(56) References Cited

U.S. PATENT DOCUMENTS

| | | | | |
|---|---|---|---|---|
| 434,216 A | * | 8/1890 | Verrell | 55/452 |
| 3,420,040 A | | 1/1969 | Neely et al. | |
| 3,672,502 A | * | 6/1972 | Janich | 209/712 |
| 4,420,314 A | | 12/1983 | Barron, Jr. | |

FOREIGN PATENT DOCUMENTS

| | | |
|---|---|---|
| FR | 1.306.932 | 2/1963 |
| FR | 1.355.017 | 6/1964 |
| GB | 920230 | 3/1963 |

* cited by examiner

*Primary Examiner*—Robert A. Hopkins
(74) *Attorney, Agent, or Firm*—McCormick, Paulding & Huber LLP

(57) ABSTRACT

The preliminary cleaning stage for a dust extraction installation for blast furnace gas is comprised of a large-sized cyclone which comprises a vertical pressurized tank. A gas furnace gas line arriving from the blast furnace is connected to an axial delivery device situated at the upper end of the pressurized tank. The delivery device is configured such that it introduces the blast furnace gas into the pressurized tank in an axial direction. A swirl device with guide vanes is positioned below the axial delivery device and causes the blast furnace gas which is axially introduced into the pressurized tank to swirl about the axis of the pressurized tank.

15 Claims, 5 Drawing Sheets

DUST EXTRACTION INSTALLATION FOR BLAST FURNACE GAS

FIELD OF THE INVENTION

BACKGROUND OF THE INVENTION

The invention relates to adjust extraction installation for blast furnace gas.

Dust extraction installations for blast furnace gas generally comprise a preliminary cleaning stage and a fine cleaning stage. The preliminary cleaning stage is formed by a dust catcher. The latter consists essentially of a large vertical pressure vessel, which is connected to the blast furnace throat via a gas pipe with a large cross-section. The gas enters the pressure vessel vertically from the gas pipe, wherein the increase in cross-section on entry of the gas into the pressure vessel results in a considerable reduction of its velocity. Consequently at least the coarsest particles fall vertically from the gas flow before the flow leaves the dust catcher at the top end of the pressure vessel after reversal of direction. The separated particles are collected in a dust hopper, from which they are removed via a lock, at the bottom end of the pressure vessel. The pre-cleaned blast furnace gas then passes from the dust catcher to the fine cleaning stage, which normally comprises at least one gas scrubber or electrostatic precipitator.

As the dust catcher achieves poor separation efficiency, the blast furnace gas can also be passed through a cyclone separator after leaving the dust catcher and before being passed to the fine cleaning stage. A cyclone separator of this type comprises one or more cyclones connected in parallel. The latter are pressure vessels, into which the blast furnace gas is fed tangentially at high speed, with the result that it is set into a swirling motion. The particles are thrown by centrifugal force to the outer wall of the cyclone separator and slide down this outer wall into a dust hopper. It is obvious that two-stage preliminary cleaning of this type significantly increases the costs of the dust extraction installation and requires expensive piping on the gas side for the connection of the cyclone separators connected in parallel.

A dust extraction installation for blast furnace gas in which the dust catcher is replaced by a single large cyclone separator has likewise already been built (dust extraction installation of blast furnace No. 2 in the Schwelgen works of THYSSEN Krupp Stahl AG). The main gas pipe from the blast furnace is introduced tangentially into the cyclone vessel, with the result that the blast furnace gas is set into a swirling motion, so that the dust separation takes place as already described above. However, a large cyclone separator of this type has so far been unable to displace the familiar dust catcher from the market, although there has long been a requirement for more efficient preliminary cleaning of the blast furnace gas. The chief reasons are most probably: (1) problematical connection of the gas pipe from the blast furnace throat to the large cyclone separator; (2) reservations about wear on the pressure vessel and (3) a lack of empirical values concerning the use of such large cyclone separators for the preliminary cleaning of blast furnace gases. With regard to (1) it should be stated that the tangential connection of the large blast furnace gas pipe (with a cross-section up to 4 m) to the cyclone vessel requires inter alia a complicated pipe route, lateral supporting structures requiring a lot of space, additional pipe bends and compensators and expensive rectangular ducts, which are reinforced against buckling. If an existing dust catcher is to be replaced by a large cyclone separator, this necessitates important modifications to the blast furnace gas pipe and steel construction. There is often insufficient space for lateral supporting structures for the gas pipe from the blast furnace throat. In this connection it should likewise be pointed out that the support of the gas pipe from the blast furnace throat is by no means unproblematical due to the heavy weight of the pipe (heavy refractory lining), the wind load to be taken into account (large diameter) and the thermal expansion (large length and large temperature differences). With regard to (2) it should be noted by way of explanation that the gas flowing into the cyclone separator impinges frontally at high speed on the vessel wall, which leads to heavy wear. With regard to (3) it should be mentioned that the blast furnace operators fear inter alia that the predicted separation characteristics of the large cyclone separator will not be observed. As the separation characteristics of a cyclone separator of this type are determined exclusively by the geometry of the cyclone separator and the tangential gas inflow, it will be appreciated that subsequent improvement of the separation characteristics is possible only at considerable cost.

Therefore, the problem underlying the present invention is to provide a dust extraction installation for blast furnace gas with a preliminary cleaning stage, which has a high separation efficiency but does not have the above-mentioned disadvantages of the known solution with a large cyclone separator as the preliminary cleaning stage, or has these disadvantages only to a reduced extent.

SUMMARY OF THE INVENTION

According to the invention this problem is solved by a dust extraction installation according to claim 1. A dust extraction installation of this type comprises, in a known manner, a preliminary cleaning stage and a fine cleaning stage. The preliminary cleaning stage is formed by a large cyclone separator, which comprises a vertical pressure vessel, into which a gas pipe from the blast furnace terminates. According to the invention an axial feed device for the blast furnace gas, to which the gas pipe from the blast furnace can be connected, is provided at the top end of the pressure vessel. This axial feed device is designed in such a way that it introduces the blast furnace gas into the pressure vessel in an axial direction. A swirl device with guide blades is arranged under the feed device. It is designed in such a way that it causes the blast furnace gas introduced axially into the pressure vessel to swirl about the axis of the pressure vessel. The particles present in the blast furnace gas are thrown by the centrifugal force to an outer wall of the pressure vessel and slide down this wall. It should be stated that the axial feed device for the blast furnace gas, compared to a tangential feed device, substantially simplifies the connection of the large cyclone separator to the gas pipe from the blast furnace. The pipe can be connected from above to the axial feed device and thus be supported vertically above the cyclone separator. Consequently the not insignificant support problem is greatly simplified. Separate supporting structures, additional pipe bends and compensators as well as rectangular ducts reinforced against buckling for a lateral tangential connection of the pressure vessel are dispensed with. Furthermore, the wear on the vessel wall in the inflow area is greatly reduced by the axial introduction of the blast furnace gas. The swirling motion of the blast furnace gas is produced by the guide blades, which can be designed as easily interchangeable wearing parts. The dust extraction installation according to the invention thus has the additional advantage that the separation characteristics of the installation can be adapted at any time to new requirements by modifications to the guide blades in the swirling device, i.e. at acceptable cost.

The pre-cleaned blast furnace gas could be removed, for example, at the bottom end of the cyclone separator by a central outlet connection pipe. As in most cases the blast furnace gas enters the following fine cleaning stage from above, it is however advantageous to remove the pre-cleaned blast furnace gas at the top end of the pressure vessel through a central outlet connection pipe. In this case the feed device advantageously has at least two inlet connection pipes aligned upward, which terminate in the pressure vessel around the central outlet connection pipe. The greater the number of inlet connection pipes in the feed device, the more homogeneous is the inflow to the swirling device in the pressure vessel. For the connection to the blast furnace gas pipe the feed device advantageously has a distributor outside the pressure vessel. This distributor comprises a connection pipe aligned vertically upwards and pipe branches aligned downwards. The gas pipe from the blast furnace is connected to the central connection pipe and the inlet connection pipes of the feed device to the pipe branches. Hence the fine cleaning stage can be connected to the central outlet connection pipe of the pressure vessel by means of a connecting line, which is led between two adjacent pipe branches of the distributor. The distributor is preferably designed with axial symmetry.

In the pressure vessel the feed device advantageously has a tapered inlet bell extending downwards, which is traversed by the central outlet connection pipe. An annular gap, in which the swirling device is installed, is formed between the bottom edge of the inlet bell and the wall of the pressure vessel. This inlet bell is advantageously supported by the central outlet connection pipe, so that the pressure vessel and inlet bell can expand independently of each other.

The guide blades are advantageously inserted from outside through slits in the wall of the pressure vessel into the swirling device, so that they can be changed relatively easily. In an advantageous embodiment each of the guide blades has at its outer end a mounting plate, which is screwed with a seal on to a flange which encloses the corresponding slit in the wall of the pressure vessel. The inner end of a guide blade can be introduced into a slit-type recess in the bottom edge of the inlet bell in order to keep the gas flow passing the swirling device as small as possible.

BRIEF DESCRIPTION OF THE DRAWINGS

An exemplified embodiment of the invention will now be described below with reference to the enclosed figures, wherein.

DETAILED DESCRIPTION OF THE PREFERRED EMBODIMENT

Figure 1:
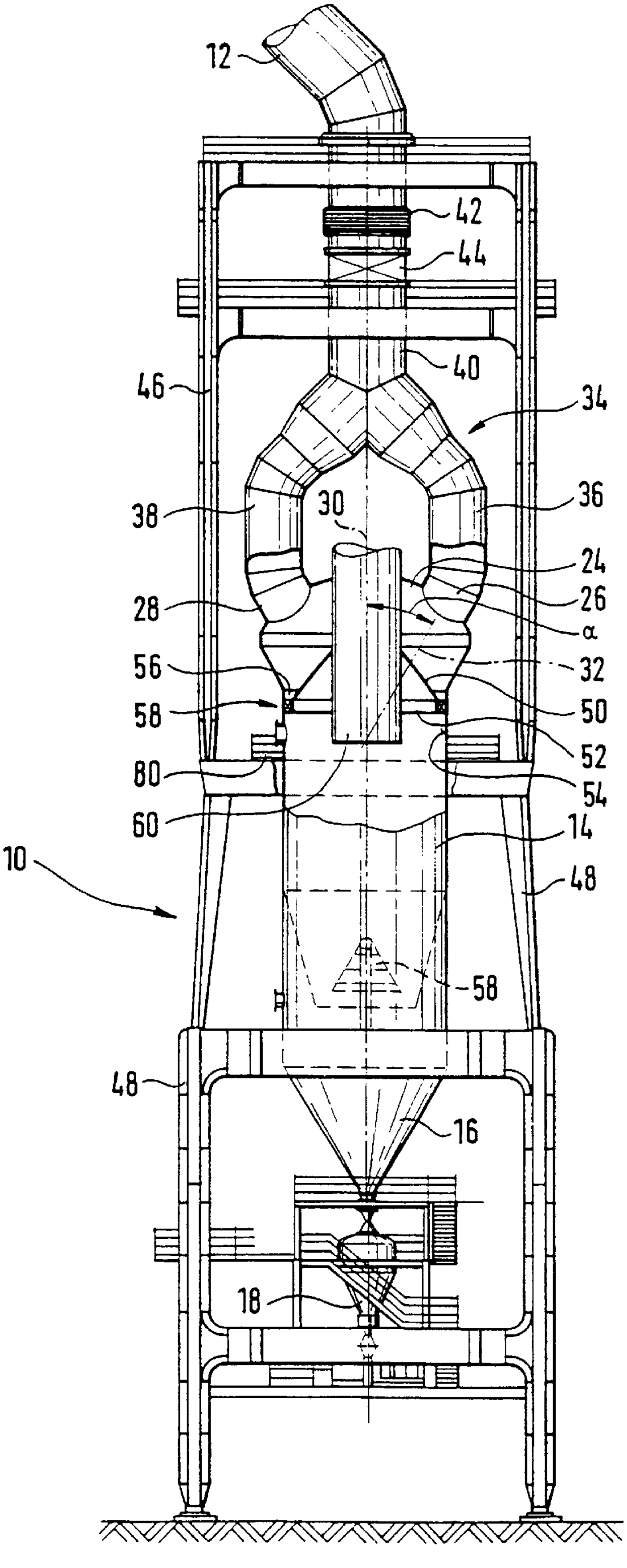
FIG. 1: is an elevation, which is partially drawn as a section, of a preliminary cleaning stage of a dust extraction installation for blast furnace gas according to the invention.
Figure 2:
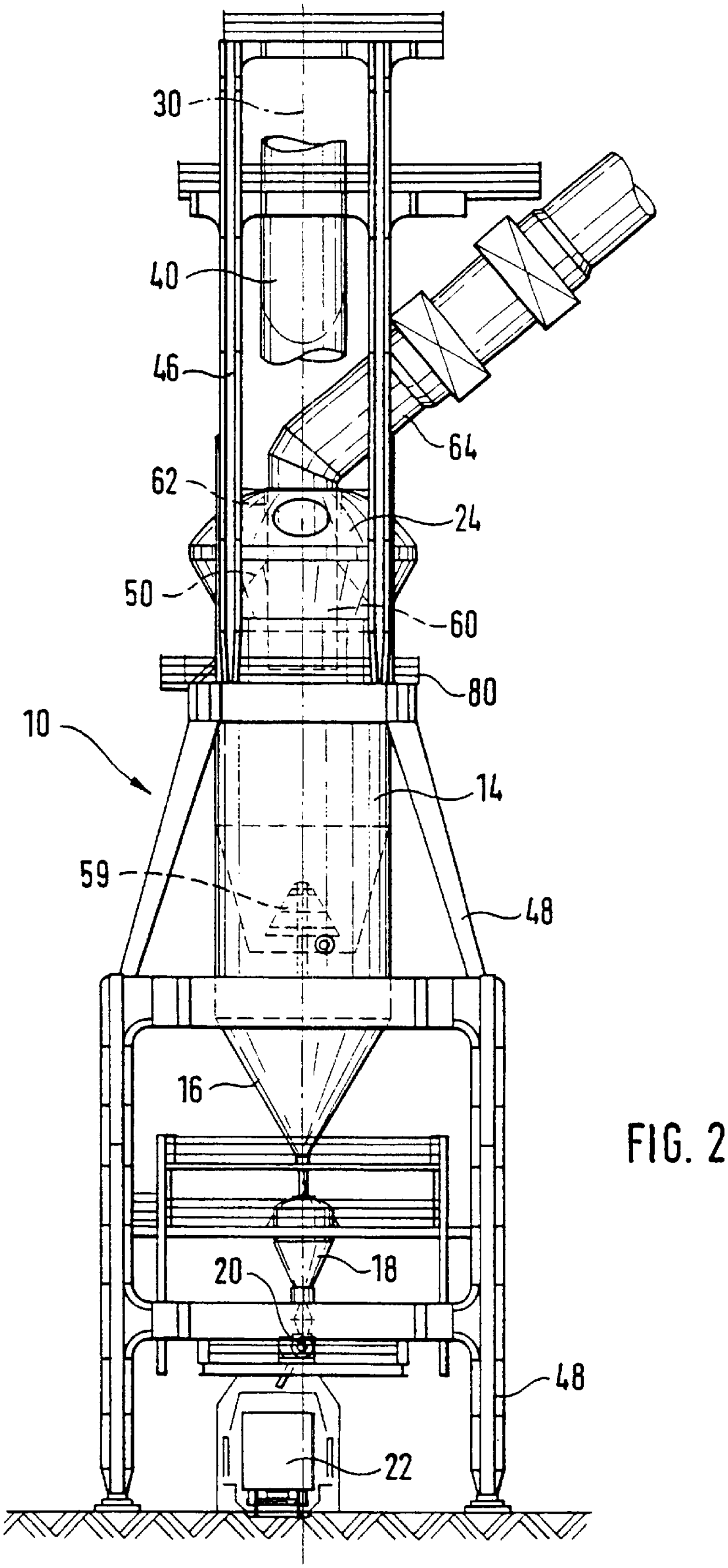
FIG. 2: is an elevation as in FIG. 1, but offset by 90°.

The preliminary stage of a dust extraction installation for blast-furnace gas according to the invention shown in FIGS. 1 and 2 is formed by a large cyclone separator, which is designated 10. The blast-furnace gas to be cleaned is fed to the preliminary cleaning stage via a blast furnace gas pipe 12, which comes directly from the blast furnace throat (not shown).

The large cyclone separator 10 comprises a vertical cylindrical pressure vessel 14. The bottom end of the pressure vessel 14 forms a dust hopper 16, which can be emptied in a known way via a lock unit 18. FIG. 2 shows e.g. the emptying of the lock unit 18 via a chute 20 into a rail wagon.

The top end of the pressure vessel 14 is shown as a section in FIGS. 1 and 2. It is sealed gastight by a dome-type hood 24. As shown in FIG. 2, this hood 24 has two peripheral inlet connection pipes 26, 28, which are arranged symmetrically with the central axis 30 of the pressure vessel 14. The angle a between the central axis 30 of the pressure vessel 14 and the central axis 32 of an inlet connection pipe 26 is about 30°.

An axially symmetrical distributor is designated 34 in FIG. 1 (the axis of symmetry of the distributor is the axis 30). This distributor 34 is shaped like a Y-pipe. It has two pipe branches 36, 38, which extend downwards and with which it is connected to the two inlet connection pipes 26, 28 of the dome-type hood 24, as well as a connection pipe 40 extending vertically upwards. The latter is connected via a compensator 42 and if necessary a shut-off valve 44 to the blast furnace gas pipe 12. It should be noted that the blast furnace gas pipe 12 rests vertically on an upper supporting framework 46, which in turn rests on a lower supporting framework 48, which carries the large cyclone separator 10 or is supported laterally at its top end. However, it is not precluded that the blast furnace gas pipe 12 can directly rest vertically on the pressure vessel 14.

The blast furnace gas is introduced essentially axially into the pressure vessel 14 via the connection pipes 26, 28. It encounters here an inlet bell 50 expanding downwards, which is arranged centrally in the pressure vessel 14 in such a way that an annular gap 56 is formed between the bottom edge 52 of the inlet bell 50 and the wall 54 of the pressure vessel. A swirling device 58, the construction of which is described below, is arranged in this annular gap 56.

The swirling device 58 causes the blast furnace gas introduced axially into the annular gap 56 to swirl about the axis 30 of the pressure vessel 14. The particles in the blast furnace gas are thrown against the cylindrical outer wall 54 of the pressure vessel 14 by the centrifugal force and slide down this outer wall 54. They reach the already described dust hopper 16 here. At a bottom deflector bell 59 the gas flow is again diverted upwards, where it terminates under the inlet bell 50 in a central outlet connection pipe 60, which is arranged coaxially with the central axis 30 of the pressure vessel. The inlet bell 50 is traversed by the central outlet connection pipe 60 with a gastight seal and is also supported exclusively by this connection pipe. The domed hood 24 is likewise traversed by the central outlet connection pipe 60, the latter being led gastight, but at the same time with axial movability through a pipe connection pipe 62 installed in the domed hood 24, so that the outlet connection pipe 60 can expand freely in relation to the domed hood 24 (see FIG. 2). As likewise shown in FIG. 2, the central outlet connection pipe 60 is connected above the domed hood to a gas pipe 64, which conveys the pre-cleaned blast-furnace gas to the fine cleaning stage (not shown). This gas pipe 64 coming from above is led between the two pipe branches 36, 38 of the distributor 34.

Figure 3:
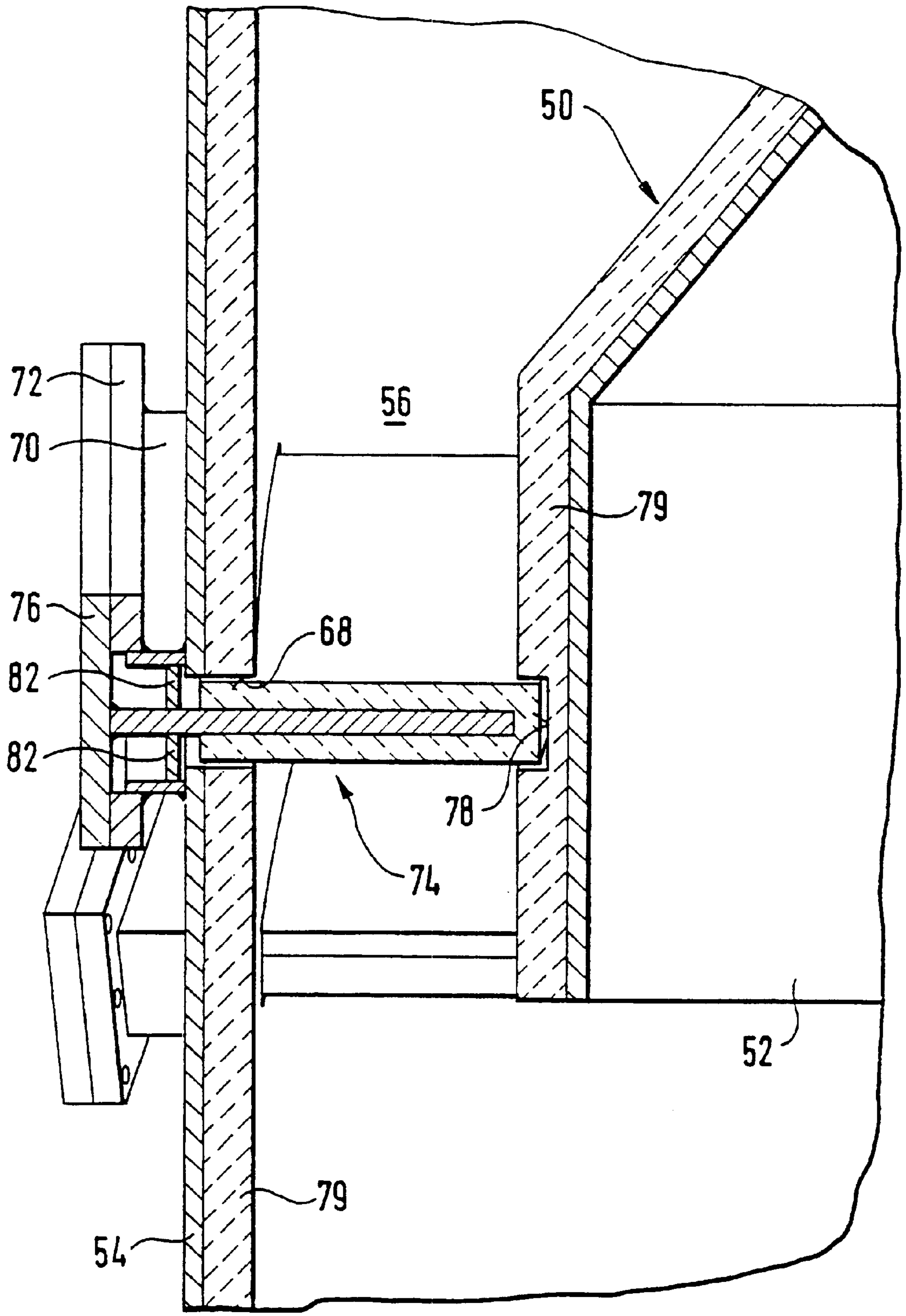
FIG. 3: is a section of a swirling device.
Figure 4:
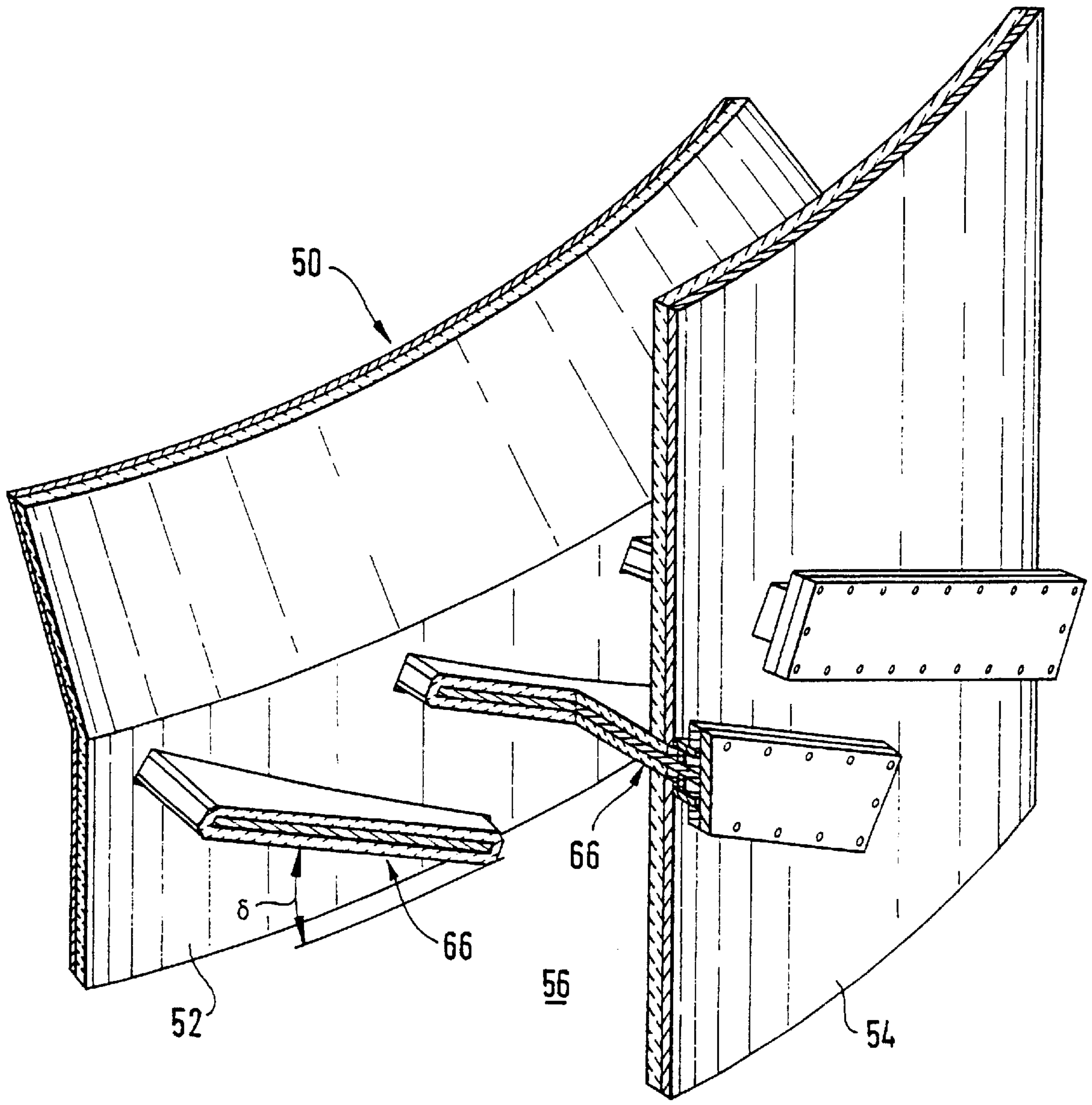
FIG. 4: is a perspective view, partially as a section, of the swirling device according to FIG. 3.

The swirling device 58 will now be described in more detail with reference to FIGS. 3 and 4. It comprises a large number (e.g. 30) of guide blades 66, which have an overlap of about 20 to 40% and an angle of incidence d of 15 to 30°. Each of the guide blades 66 is inserted from outside through a slit 68 in the wall 54 of the pressure vessel 14 into the swirling device 58. These slits 68 are each enclosed on the outside of the wall 54 by a frame 70, which carries a flange 72. The guide blades 66 each comprise a blade 74, which may be flat or curved, and a mounting plate 76, which is screwed gastight on the flange 72. The blade 74 projects in a cantilevered way from the mounting plate 76 into the pressure vessel 14. The inner end of each blade 74 can be introduced with play all round into a slit-type recess 78 of a wear lining 79 of the bottom edge 52 of the inlet bell 50. However, there is no fixed mechanical connection between the guide blades 66 and the inlet bell 50, so that the latter can expand freely in relation to the pressure vessel 14. The blades 74, the wall 54, the inlet bell 50, the deflector bell 59 and all other parts which are exposed to heavy abrasion by the blast furnace dust in the cyclone separator 10 are, of course, provided with a wear lining 79 consisting e.g. of a ceramic material.

An important advantage of the swirling device 58 is that the blades 66 can be changed individually from outside. They can, in fact, easily be withdrawn from the pressure vessel 14 or pushed into the latter from an outer platform 80. Guide webs 82 on the blade 74 facilitate the mounting of the guide blades 66 by centering the blade 74 in the frame 70. Finally, it should be noted that with an adequately large slit 68 in the wall 54 even guide blades 66 with a different angle of incidence δ, a different overlap and/or a different curvature can be used. This means inter alia that the separation characteristics of the cyclone separator 10 can be subsequently changed at an acceptable cost. For example, a blast furnace operator wishing to reduce the zinc or lead content in the dust from the preliminary cleaning stage can have the swirling device 58 redesigned in such a way that the cyclone separator has a lower separation limit of about 16 mm particle size. The dust extraction installation described thus opens up new possibilities to the blast furnace operator for optimisation of dust extraction from the blast furnace gases.

Figure 5:
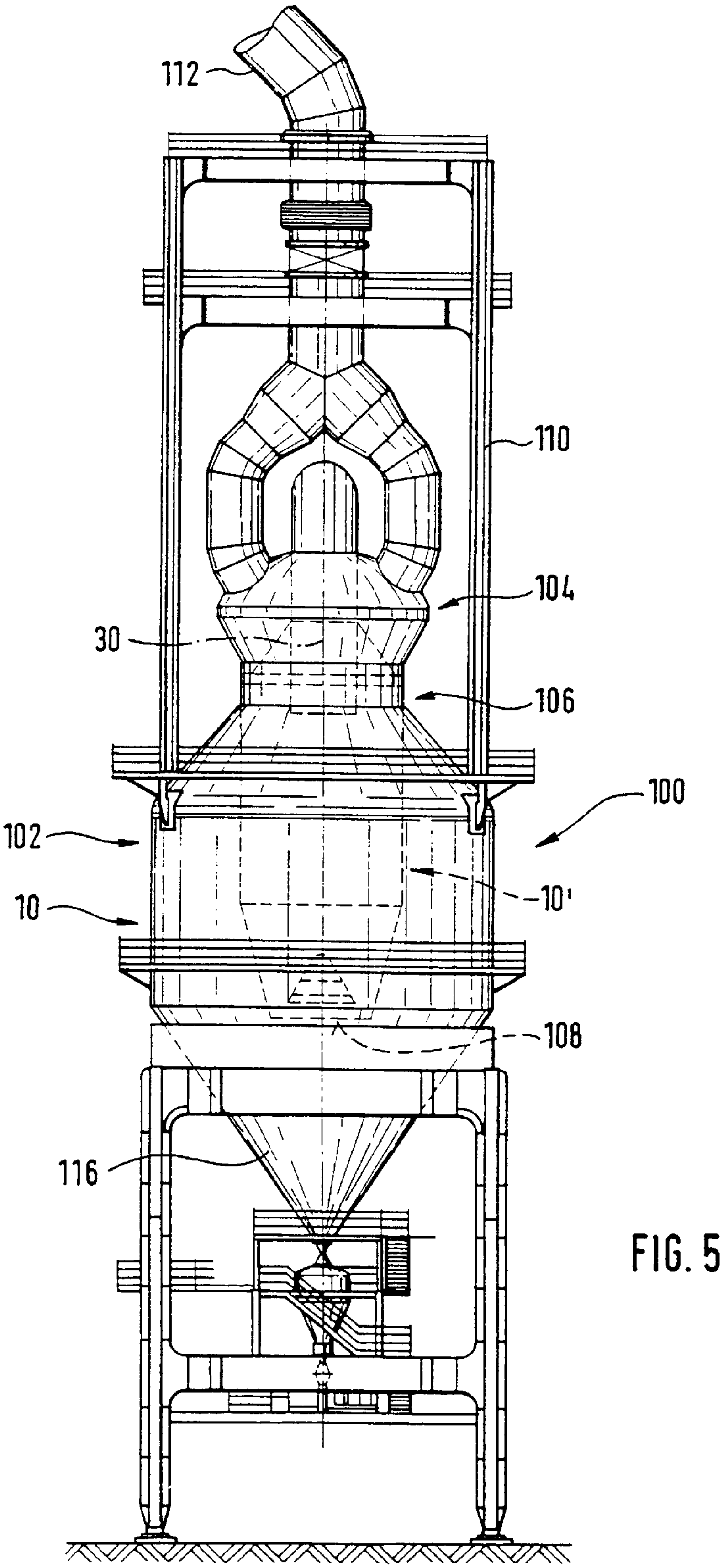
FIG. 5: is an elevation, which is partially drawn as a section, of a preliminary cleaning stage as in FIG. 1, a large cyclone separator being installed in an existing dust catcher.

FIG. 5 shows an interesting possibility for renovation according to the invention of the preliminary cleaning stage of an existing dust extraction installation with an old dust catcher 100. The large cyclone separator 10', which is essentially identical to the large cyclone separator 10 in FIGS. 1 to 4, is inserted axially in the truncated pressure vessel 102 of the dust catcher 100, from which all fittings have been removed in advance. Only the head end 104 of the large cyclone separator 10' projects from the pressure vessel 102. It is connected to the top edge of the truncated pressure vessel 102 by means of a gastight connection 106. By contrast the lower part of the large cyclone separator 10' projects axially into the pressure vessel 102 and at its base end has an opening 108 into a dust hopper 116. The latter is formed by the dust hopper of the old dust catcher 100. The supporting construction 110 for the gas pipe 112 coming from the blast furnace throat is supported by the pressure vessel 102 of the dust catcher 100. This embodiment has the important advantage that the old dust catcher need not be fully dismantled and that the modifications to the steel construction or gas pipes can be restricted to a minimum.

What is claimed is:

1. A dust extraction installation for blast furnace gas comprising:

a preliminary cleaning stage formed by a large cyclone separator and connected to a blast furnace gas pipe coming from a blast furnace; and a fine cleaning stage arranged downstream of said preliminary cleaning stage;

wherein said large cyclone separator includes:

a vertical pressure vessel having a top end, a bottom end, a central vertical axis and a lateral wall;

a feed device at said top end including a conical inlet bell, which expands downwards towards a bottom edge, so that an annular gap is defined between said bottom edge of said conical inlet bell and said lateral wall of said pressure vessel, said feed device being designed so that said blast furnace gas pipe can be connected to said feed device from above and so that said feed device feeds the blast furnace gas in an axial direction into said annular gap; and a swirling device with guide blades arranged in said annular gap, said swirling device being designed so that the blast furnace gas, which is axially fed into said annular gap, is subjected to a swirling movement about said central vertical axis of said pressure vessel.

2. The dust extraction installation according to claim 1, wherein said guide blades are inserted into said swirling device from outside through slits in said lateral wall of said pressure vessel.

3. The dust extraction installation according to claim 2, wherein:

each of said slits in said pressure vessel is surrounded by a flange;

each of said guide blades has an outer end, an inner end and a mounting plate fixed to its outer end; and said mounting plate is sealingly screwed on to said flange.

4. The dust extraction installation according to claim 3, wherein:

said inner end of guide blade is introduced into slit-type recess in said bottom edge of said inlet bell with play all around said inner end of a guide blade in said slit-type recess.

5. A dust extraction installation for blast furnace gas comprising:

a preliminary cleaning stage formed by a large cyclone separator and connected to a blast furnace gas pipe coming from a blast furnace; and a fine cleaning stage arranged downstream of said preliminary cleaning stage:

wherein said large cyclone separator includes:

a vertical pressure vessel having a top end, a bottom end and a central vertical axis, said vertical pressure vessel including a central outlet connection pipe emerging through said top end;

a feed device at said top end, said feed device including at least two upwardly projecting inlet connection pipes, which enter into said pressure vessel around said central outlet connection pipe and are designed so that said blast furnace gas pipe can be connected to said feed device from above, whereby said feed device feeds the blast furnace gas in an axial direction into said pressure vessel; and a swirling device with guide blades arranged below said axial feed device, said swirling device being designed so that the blast furnace gas, which is axially fed into said pressure vessel, is subjected to a swirling movement about said central vertical axis of said pressure vessel.

6. The dust extraction installation according to claim 5, wherein:

said feed device comprises a distributor outside said pressure vessel;

said distributor has a vertical connection pipe projecting upwardly and downwardly projecting pipe branches;

said blast furnace gas pipe is connected to said vertical connection pipe;

said inlet connection pipes of said feed device are connected to said pipe branches; and a connecting line connecting said central outlet connection pipe to said fine cleaning stage is led between two of said pipe branches.

7. The dust extraction installation according to claim 6, wherein said distributor is designed with axial symmetry.

8. The dust extraction installation according to claim 5, wherein:

said pressure vessel includes a lateral wall;

said feed device includes in said pressure vessel a conical inlet bell, which expands downwards towards a bottom edge;

said conical inlet bell is axially traversed by said central outlet connection pipe;

an annular gap is defined between said bottom edge of said conical inlet bell and said lateral wall of said pressure vessel; and said swirling device is arranged in said annular gap.

9. The dust extraction installation according to claim 8, wherein said inlet bell is supported by said central outlet connection pipe.

10. The dust extraction installation according to claim 8, wherein said guide blades are inserted into said swirling device from outside through slits in said lateral wall of said pressure vessel.

11. The dust extraction installation according to claim 10, wherein:

each of said slits in said lateral wall of said pressure vessel is surrounded by a flange;

each of said guide blades has an outer end, an inner end and a mounting plate fixed to its outer end; and said mounting plate is sealingly screwed on to said flange.

12. The dust extraction installation according to claim 11, wherein:

said inner end of a guide blade is introduced into a slit-type recess in said bottom edge of said inlet bell.

13. A dust extraction installation for blast furnace gas comprising:

a preliminary cleaning stage formed by a large cyclone separator axially inserted into a truncated pressure vessel of an old dust catcher and connected to a blast furnace gas pipe coming from a blast furnace, said large cyclone separator including:

a vertical pressure vessel having a top end, a bottom end and a central vertical axis;

a feed device at said top end, said feed device being designed so that said blast furnace gas pipe can be connected to said feed device from above and so that said feed device feeds the blast furnace gas in an axial direction into said pressure vessel; and a swirling device with guide blades arranged below said axial feed device, said swirling device being designed so that the blast furnace gas, which is axially fed into said pressure vessel, is subjected to a swirling movement about said central vertical axis of said pressure vessel.

14. The dust extraction installation according to claim 13, wherein:

said truncated pressure vessel has a top edge;

said large cyclone separator is inserted in said truncated pressure vessel of said old dust catcher so that its top end projects over said top edge of said truncated pressure vessel; and said top end of said large cyclone separator is connected to said top edge of said truncated pressure vessel by means of a gastight connection means.

15. The dust extraction installation according to claim 14, wherein:

said preliminary cleaning stage further includes a dust hopper of said old dust catcher; and said large cyclone separator has at its bottom end an opening into said dust hopper.

* * * * *